3,429,844
STABILIZATION OF POLYVINYL FLUORIDE
Clifford A. Neros, Willoughby, and Charles P. Tomba, Plainesville, Ohio, assignors to Diamond Shamrock Corporation, Cleveland, Ohio, a corporation of Delaware
No Drawing. Filed Feb. 11, 1966, Ser. No. 526,723
U.S. Cl. 260—29.1      8 Claims
Int. Cl. C08f 29/16; B44d 1/36

ABSTRACT OF THE DISCLOSURE

A thermally stable, resinous vinyl fluoride composition incorporates tripentaerythritol into a vinyl fluoride polymer containing at least 75% by weight of the total weight of the polymer of vinyl fluoride. The composition can be applied from a dispersion system through use of a latent solvent and may be colored through use of pigments. Substrates may be coated with the thermally stable resinous vinyl fluoride compositions of this invention.

The present invention relates to the stabilization of fluorine containing vinyl resins, particularly vinyl fluoride resins. Specifically, the present invention is particularly applicable to the stabilization of pigmented vinyl fluoride polymer resin compositions and coated articles therefrom.

Vinyl fluoride polymers particularly in the form of films and coatings, display a combination of excellent properties, e.g., weatherability (resistance to degradation when exposed to outdoor conditions), pliability and strength (flexural, tensile and tear) well within desirable ranges. Due to the fact that vinyl fluoride polymer deteriorates upon heating prior to reaching the high temperatures necessary to prepare a film or coating and the polymer is insoluble in commonly used volatile solvents, such as acetone, petroleum ether, iso-octane, xylene, etc., it has been found necessary to disperse the vinyl fluoride resin in the form of discrete particles in a suitable liquid medium which has substantially no solvent action on the polymer at room temperature, but which is capable at elevated temperatures of coalescing the polymer particles. However, vinyl fluoride polymers still are subject to severe degradation and consequent discoloration upon exposure to the high temperatures necessary for fusion of the polymer. Lack of such stability is a serious obstacle to the commercial exploitation of this polymer.

While considerable activity has been undertaken in the field of polymer stabilization in an attempt to improve heat stability of vinyl-type resins and numerous additives have been suggested and tried as polymer additives for incorporation in vinyl resins to prevent or minimize such deterioration, none of these stabilizers has been found effective for a vinyl fluoride polymer system, particularly a pigmented vinyl fluoride polymer system. In other words, the prior art stabilizers or stabilizer systems which are effective to inhibit the deterioration of a vinyl polymer not containing other additives have been found to be ineffective in a vinyl fluoride polymer system containing latent solvent and pigment. Using a wide variety of stabilizers and stabilizer systems suggested in the prior art, vinyl fluoride polymer coating systems containing latent solvent and pigment become discolored at the fusion temperatures generally employed to bake satisfactorily the coating to a substrate. To date, there has been found no stabilizer or stabilizer system effective to prevent discoloration of both a vinyl fluoride polymer and a vinyl fluoride polymer system containing the resin, latent solvent therefor and pigment.

Accordingly, it is an object of this invention to provide a stabilized vinyl fluoride polymer having an increased resistence to color degradation or deterioration.

It is a further object of the present invention to provide a pigmented vinyl fluoride polymer system having increased resistance to color degradation or deterioration upon baking at elevated temperatures.

The above and related objects are achieved by incorporating in the vinyl fluoride polymer or vinyl fluoride polymer system comprising vinyl fluoride polymer, latent solvent therefor and pigment, a stabilizing amount of tripentaerythritol.

While polyols, such as trimethylolethane, trimethylolpropane, pentaerythritol, sorbitol, mannitol, methylglucoside, sucrose, hyroxy propylsurcrose (hyprose) previously have been employed as stabilizers in vinyl-type resin, such as polyvinyl chloride, it has been found that these polyols do not provide effective stabilization for vinyl fluoride polymers against heat deterioration. However, it has now been found that tripentaerythritol when employed in stabilizing effective quantities provides adequate protection to vinyl fluoride polymers against heat deterioration.

In addition to the homopolymers of vinyl fluoride, which are preferred, there may be employed copolymers of vinyl fluoride with other monoethylenically unsaturated monomers, copolymerizable therewith, wherein the vinyl fluoride is present in substantial or in major amounts, i.e., at least 75% to 80% of the total by weight. Examples are monoethylenic hydrocarbons, e.g., ethylene, propylene, isobutylene and styrene; halogen-substituted monoethylenic hydrocarbons, e.g., vinyl chloride, vinyl bromide, 1,1-dichloroethylene, 1,1-difluoroethylene, difluorochloroethylene, trifluorochloroethylene, tetrachloroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate, vinyl salicylate and vinyl esters of inorganic acids; vinyl ethers, e.g., vinyl ethyl ether, tetrafluoroethyl allyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., esters, nitriles, amides, anhydrides and acid halides, including methyl methacrylate, beta hydroxyethyl methacrylate, allyl methacrylate, acrylonitrile, N-butyl methacrylamide, etc.; derivatives of maleic and fumaric acids, e.g., diethylmaleate and dimethylfumarate; propenyl esters; e.g., allyl acetate; isopropenyl acetate, etc. The presence of these copolymers or even a small percentage of a comonomer which, as a homopolymer, is normally more soluble in the selected latent solvent than is the homopolymer of vinyl fluoride, may render said copolymer sufficiently more soluble in aforementioned latent solvent as to permit its application on a substrate containing considerably less solvent than is needed in the application of homopolymers of vinyl fluoride.

Suitable vinyl fluoride polymers have an intrinsic viscosity of at least about 0.35 and preferably at least about 0.75. The polymer particle may range in size up to about 30 microns in diameter, preferably the diameter of the polymer particles is below about 20 microns. The size of the polymer particle may be reduced by a variety of means known in the art, such as ball milling or grinding. Although particle sizes as low as 0.005 microns may be employed, it is preferable that the size of the particle be within the range of 0.05 to 5 microns. The particles in a given dispersion need not be uniform in size.

The latent solvents which may be used in the dispersion system of the present invention generally have boiling points of at least about 100° C., preferably boiling points above about 120° C., but below the point at which the vinyl fluoride polymer begins to deteriorate or degrade. The latent solvent employed need not necessarily be liquid at room temperature provided its melting point is not so high that the temperature necessary for liquid blending of the latent solvent does not subject the polymer to thermal degradation.

Following are examples of specific compounds representative of the class of latent solvents useful in the process of the present invention: gamma butyrolactone, butadiene cyclic sulfone, tetramethylenesulfone, dimethylsulfolane, hexamethylenesulfone, diallylsulfoxide, dimethylsulfoxide, dicyanobutene, adiponitrile, ethylene carbonate, propylene carbonate, 1,2-butylene carbonate, 2,3-butylene carbonate, isobutylene carbonate, trimethylene carbonate, N,N-diethylformamide, N,N-dimethylacetamide, N,N - dimethylformamide, N,N - dimethylgamma - hydroxyacetamide, N,N - dimethyl-gamma - hydroxybutyramide, N,N-diethylacetamide, N,N-dimethylmethoxyacetamide, N-methylacetamide, N-methylformamide, N,N-dimethylaniline, N,N-dimethylethanolamine, 2-piperidone, N-methyl-2-piperidone, N-methyl-2-pyrrolidone, N-ethyl-2-pyrrolidone, N-isopropyl-2-pyrrolidone, 5-methyl-2-pyrrolidone, beta-propiolactone, delta-valerolacetone, gamma - valerolacetone, alpha - angelicalactone, beta - angelica - lactone, epsilon-caprolactone, and alpha, beta and gamma-substituted alkyl derivatives of gamma-butyrolactone, gamma-valerolactone and delta valerolactone, as well as delta-substituted alkyl derivatives of delta-valerolactone, tetramethyl urea, 1-nitropropane, 2-nitropropane, acetonyl acetate, acetophenone, acetyl acetone, cyclohexanone, diacetone, alcohol, dibutyl ketone, isophorone, mesityl oxide, methylamyl ketone, 3 - methylcyclohexanone, bis - (methoxy - methyl) uron, methylacetylsalicylated, diethyl phosphate, dimethyl phthalate, ethyl acetoacetate, methyl benzoate, methylene diacetate, methyl salicylate, phenyl acetate, triethyl phosphate, tris-(morpholino)phosphine oxide, N-acetylmorpholine, N-acetylpiperidine, isoquinoline, quinoline, pyridine and tris-(dimethylamido)phosphate.

Of the many pigments employed white pigments have been the most successfully used in coating exterior surfaces. Titanium dioxide has been the most widely employed white inorganic pigmentary substance probably because of a combination of innate properties it possesses, i.e., high refractive index, lack of color (whiteness), physical and chemical stability and relatively low specific gravity. Titanium dioxide pigments are classified as either "chalking" or "non-chalking." Chalking-type pigment is characterized by a gradual film deterioration to a powdery chalk which is removed by the eroding action of wind and rain to expose the underlying section to further attack resulting in a progressive wearing away of the coating system. Anatase crystal modification of titanium dioxide exhibits this chalking characteristic. For most commercial coating applications, however, chalking-type pigments are not employed for the above reason.

The rutile crystal modification of titanium dioxide, especially rutile crystals treated with silicone, aluminum or zinc, exhibits non-chalking characteristics. Like the chalking, crystal-type modification, anatase, color development also occurs with rutile during the baking operation. Unlike dispersion coating systems containing the chalking-type pigment, dispersion coating systems containing the non-chalking type pigment are difficult to stabilize and are not necessarily stabilized with compounds found suitable to stabilize a system containing the chalking-type pigment. However, using the stabilization system of the present invention whatever form of crystal modification of titanium dioxide is employed the resultant pigment vinyl fluoride polymer coating is resistant to discoloration on baking and subsequent aging.

In addition to the reactive pigment the dispersion system may contain other highly divided solid pigments, pigment extenders, fillers or the like and other conventionally used compounding pigmented systems such as lithopone, zinc sulfide iron oxide, mica china clay, mineral silicate and coloriferous agents. Also, protective colloids and pigment dispersing or deflocculating agents, such as tetrasodium pyrophosphate or potassium tripolyphosphate may be employed.

The proportions of vinyl fluoride polymer, latent solvent, pigment and stabilizer may vary depending on the type of application and the method of application desired. The amount of latent solvent is adjusted to give a fluid or sometimes viscous composition that is of suitable consistency for application to the particular substrate which is to be coated. This, of course, will vary greatly according to the manner of application; for instance, whether it is desired to spray the dispersion on the substrate, to dip the substrate into the dispersion or to apply the dispersion on the substrate with some sort of roller system as well as other factors such as temperature, type of liquid dispersants employed and the like.

Generally, however, from about 25 to 400 parts, preferably about 50 to 200 parts, by weight, of latent solvent per 100 parts of vinyl fluoride polymer have been found suitable. The stabilizer system may be incorporated into the resin system in stabilizing concentrations from about 0.05 to 7.5 parts, preferably about 0.1 to about 5 parts, by weight, based on 100 parts, by weight, of vinyl fluoride polymer. The pigment is present in the dispersion system within the range from about 5 to 75 parts, by weight, preferably 10 to 60 parts, by weight, per 100 parts, by weight, of vinyl fluoride polymer. Other ingredients which generally are employed in dispersion coating systems may be added to the vinyl fluoride polymer dispersion system of the present invention. Exemplary of these additives are thickening agents, i.e., polymethylmethacrylates, polymethylmethacrylate copolymers of acrylonitrile with methamethacrylate, vinyl resins, carboxyl vinyl, cellulose acetate and the like; neutralizing agents, i.e., amines and the like.

The vinyl fluoride polymer dispersion system may be prepared by blending the vinyl fluoride polymer, latent solvent therefor, pigment and stabilization system in a wide variety of mixing equipment, including Hobart mixers, Waring Blendors, ball mills, colloid mills, sand grinding equipment and the like. Advantageously, a pigment slurry containing the pigment, stabilization system and part of the latent solvent first is prepared in order to grind and disperse thoroughly the pigment before introducing the vinyl fluoride polymer. Also, in order to facilitate further dispersing the vinyl fluoride polymer, a solvent solution containing the remaining portion of latent solvent to be employed and other additives such as thickening agents and like ingredients may be prepared beforehand to ensure solution. Once the pigment slurry and latent solvent solution have been prepared, the vinyl fluoride polymer then may be incrementally added to the pigment slurry-latent solvent solution mixture in a high speed agitator followed by a ball milling of the resultant dispersion, if desired.

A great variety of substrates may be coated in accordance with this invention. For example, leather, cloth, resins, wood, stones, concrete, cement and of special interest coatings for metals including steel, aluminum, iron, magnesium and nickel and any alloy thereof.

After the vinyl fluoride polymer dispersion system of the present invention has been applied as a coating to the substrate, adhesion is achieved by employing heat to cure the dispersion system without discoloration or decomposition of the coating during baking. The heat curing of the pigmented vinyl fluoride polymer dispersion system may proceed by the method disclosed in Serial No. 273,550, filed April 17, 1963, now Patent No. 3,317,336. The method disclosed therein comprises heat curing the applied vinyl fluoride polymer under controlled conditions involving heating the coating at a temperature sufficient to coalesce the pigmented vinyl fluoride polymer on the substrate and then heating the coalesced vinyl fluoride polymer at a temperature of at least about 50° F. above the initial heat curing treatment. Alternatively, the applied pigmented vinyl fluoride polymer dispersion coating may be heat cured in a single heat treating step comprising heating the applied pigmented polyvinyl fluoride dispersion coating at an elevated temperature, generally in excess of about 450° F., for a sufficient period of time to effect adhesion of the coating to the substrate. This method is disclosed in Serial. No. 370,118, filed May 25, 1964, now Patent No. 3,360,396.

In order that those skilled in the art may more completely understand the present invention and the preferred method by which the same may be carried into effect the following specific example is offered.

EXAMPLE 1

A series of white pigmented polyvinyl fluoride dispersion systems containing titanium dioxide (Titanox RA-NC—Titanium Pigment Corp.) and employing various stabilizers are prepared having the following recipe:

| Component: | Parts by weight |
| --- | --- |
| Polyvinyl fluoride | 100 |
| Dimethylphthalate | 298 |
| Titanium dioxide pigment | 40 |
| Stabilizer | 1.0–2.0 |

The polyvinyl fluoride employed has an intrinsic viscosity of 0.9. The pigmented polyvinyl fluoride dispersion is prepared by first making a pigment slurry and solvent solution and then incrementally mixing into this mixture the polyvinyl fluoride. The ingredients are ground in a ball mill for 24 hours after which the pigmented dispersion is deaerated to remove all contained air.

The prepared pigmented polyvinyl fluoride dispersions are applied to alodized aluminum panels (6 x 12″ chromate-treated aluminum panels supplied by Q-Panel Company, Cleveland, Ohio) by means of a Baker Film Applicator to give a dry film thickness of about 1 mil. The wet films are heated in a hot air circulating oven at 500° F. for various time periods. Observations are then made concerning color retention and adhesion of the finished pigmented coating. The particular stabilizers employed and data obtained from the color retention test and adhesion test for each coating are reported in Table I, below.

The adhesion test comprises cross scoring a one-inch square portion of the coated surface with score marks 1/16″ apart. The scored surface is then subjected to a reverse impact of 70 inch-pounds on a Gardner Reverse Impact Instrument. Scotch tape #600 is pressed over the impacted, scored coated area and then quickly removed. Adhesion failure is indicated by removal of any portion of the coating by the tape. If no portion of the coating is removed the adhesion is considered adequate.

It is claimed:
1. A composition of matter consisting essentially of a major amount of a vinyl fluoride polymer containing at least 75% by weight of the total weight of the polymer vinyl fluoride and 0.05 to 7.5 parts, by weight, per 100 parts, by weight, of said polymer of tripentaerythritol, said composition having heat stability and adhesion characteristics at elevated temperatures.
2. The composition of claim 1 wherein the stabilizer is present in amounts from about 0.1 to 5 parts, by weight, per 100 parts, by weight, of vinyl fluoride polymer.
3. A composition of claim 1 which additionally contains a latent solvent for the vinyl fluoride polymer and a pigment.
4. The composition of claim 3 wherein the pigment is titanium dioxide.
5. The composition of claim 4 wherein the titanium dioxide pigment is non-chalking.
6. The composition of claim 3 which consists essentially of 100 parts, by weight, vinyl fluoride polymer containing at least 75% by weight of the total weight of the polymer of vinyl fluoride, 25 to 400 parts, by weight, latent solvent therefor, 5 to 75 parts titanium dioxide pigment based on the weight of polymer and 0.05 to 7.5 parts, by weight, of tripentaerythritol, based on the weight of polymer.
7. An article of manufacture which comprises a substrate coated with a pigmented vinyl fluoride polymer, said coating being prepared from a dispersion system consisting essentially of vinyl fluoride polymer, containing at least 75% by weight of the total weight of the polymer of vinyl fluoride, a latent solvent therefor, a pigment and 0.05 to 7.5 parts, by weight, of tripentaerythritol, per 100 parts, by weight, of said polymer, said coating having heat stability and adhesion characteristics at elevated temperatures.
8. The article of claim 7 wherein the substrate is metal.

References Cited

UNITED STATES PATENTS

| | | | |
| --- | --- | --- | --- |
| 2,419,010 | 4/1947 | Coffman et al. | 260—92.1 |
| 2,479,957 | 8/1949 | Newkirk | 260—45.75 |
| 2,861,052 | 11/1958 | Elliott | 260—45.95 |
| 2,935,491 | 5/1960 | Mack | 260—45.95 |
| 3,081,208 | 3/1963 | Bottorf et al. | 260—92.1 |
| 3,139,470 | 6/1964 | Prengle et al. | 264—289 |
| 3,242,133 | 3/1966 | Lindsey | 260—45.95 |
| 3,281,381 | 10/1966 | Hechenbleikner et al. 260—45.95 |

TABLE I

| Run No. | Stabilizer | Concentration (parts per hundred) | Time (minutes) | | | |
| --- | --- | --- | --- | --- | --- | --- |
| | | | 2 | 3 | 4 | 5 |
| | | | Color AD | Color AD | Color AD | Color AD |
| 1 | Pentaerythritol | 1.0 | W, P | OW, P | | |
| 2 | do | 1.5 | W, P | OW, P | | |
| 3 | do | 2.0 | W, P | OW, P | | |
| 4 | Dipentaerythritol | 1.0 | W, F | OW, P | | |
| 5 | do | 1.5 | W, F | W, P | OW, P | |
| 6 | do | 2.0 | W, F | W, F | SS, P | |
| 7 | Tripentaerythritol | 1.0 | W, P | W, P | S, P | |
| 8 | do | 1.5 | W, P | W, P | S, P | |
| | do | 2.0 | W, P | W, P | W, P | S, P |

Code:
Color.—W=white; OW=color change; SS=slightly spotted; S=spotted.
Adhesion.—F=failed; P=passed.

As can be seen from these data, the system employing tripentaerythritol as the stabilizer achieves better color stability while attaining the necessary adhesion than the systems employing pentaerythritol and dipentaerythritol.

It is to be understood that although the invention has been described with specific reference to particular embodiments thereof, it is not to be so limited since changes and alterations therein may be made which are within the full intended scope of this invention as defined in the appended claims.

| | | | |
| --- | --- | --- | --- |
| 3,285,868 | 11/1966 | Hecker et al. | 260—45.95 |
| 3,337,495 | 8/1967 | Corbett et al. | 260—45.95 |
| 3,320,206 | 5/1967 | Neros | 260—41 |

MORRIS LIEBMAN, *Primary Examiner.*

BURTON A. AMERNICK, *Assistant Examiner.*

U.S. Cl. X.R.

117—132, 161; 260—30.2, 45.95, 41, 32.8, 32.6, 32.4, 31.8, 31.2, 30.8, 30.6, 30.4